(12) United States Patent
James et al.

(10) Patent No.: US 12,418,753 B2
(45) Date of Patent: Sep. 16, 2025

(54) AUDIO DEVICE WITH ULTRASOUND MOVEMENT DETECTION

(71) Applicant: GN Audio A/S, Ballerup (DK)

(72) Inventors: Robert James, Ballerup (DK); Clément Laroche, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 175 days.

(21) Appl. No.: 18/522,095

(22) Filed: Nov. 28, 2023

(65) Prior Publication Data
US 2024/0214750 A1   Jun. 27, 2024

(30) Foreign Application Priority Data
Dec. 22, 2022  (EP) .................................. 22215843

(51) Int. Cl.
H04R 25/00       (2006.01)
(52) U.S. Cl.
CPC ........... *H04R 25/405* (2013.01); *H04R 25/50* (2013.01)
(58) Field of Classification Search
CPC .............................. H04R 25/405; H04R 25/50
See application file for complete search history.

(56) References Cited

U.S. PATENT DOCUMENTS

| 11,402,499 | B1* | 8/2022 | Kamath Koteshwara ................... G01S 7/539 |
| 2012/0224456 | A1 | 9/2012 | Visser et al. |
| 2013/0272096 | A1 | 10/2013 | Vijay et al. |
| 2025/0013426 | A1* | 1/2025 | James .................. G06F 3/165 |

FOREIGN PATENT DOCUMENTS

| EP | 1914563 B1 | 1/2010 |
| EP | 3657700 A1 | 5/2020 |

OTHER PUBLICATIONS

The extended European search report issued in European application No. 22215843.8, dated Jun. 14, 2023.

* cited by examiner

Primary Examiner — Andrew Sniezek
(74) Attorney, Agent, or Firm — HSML P. C.

(57) ABSTRACT

An audio device comprising, an interface, one or more first output transducers, one or more input transducers, and a processor. The audio device is configured to emit a first ultrasound signal, receive a first reflection indicative of the first ultrasound signal, process the first reflection to determine movement, and in response to movement being determined, adjust one or more audio processing parameters of the audio device.

12 Claims, 5 Drawing Sheets

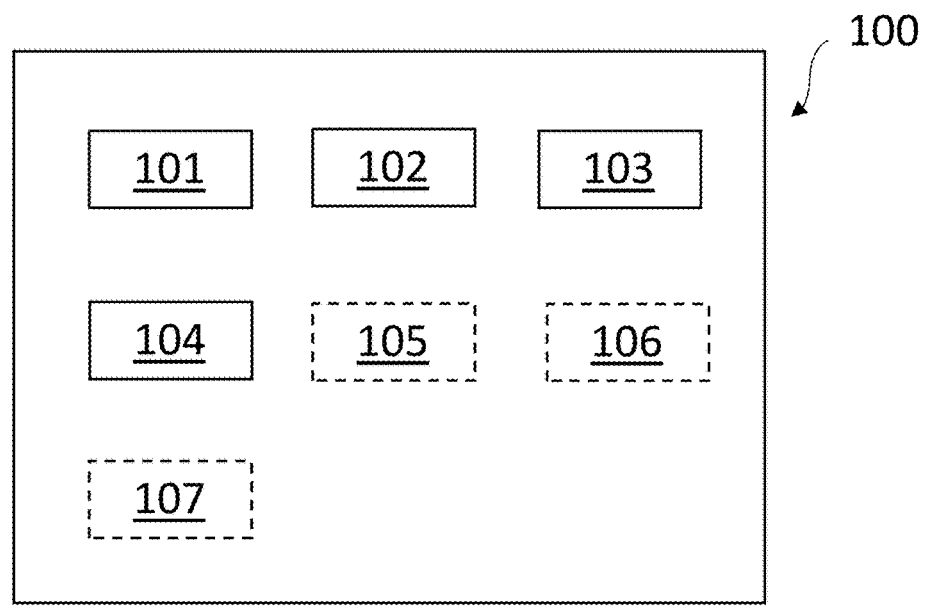
Fig. 1
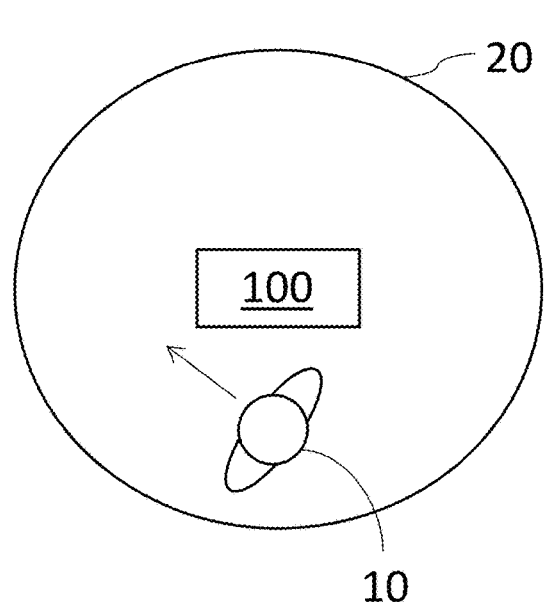 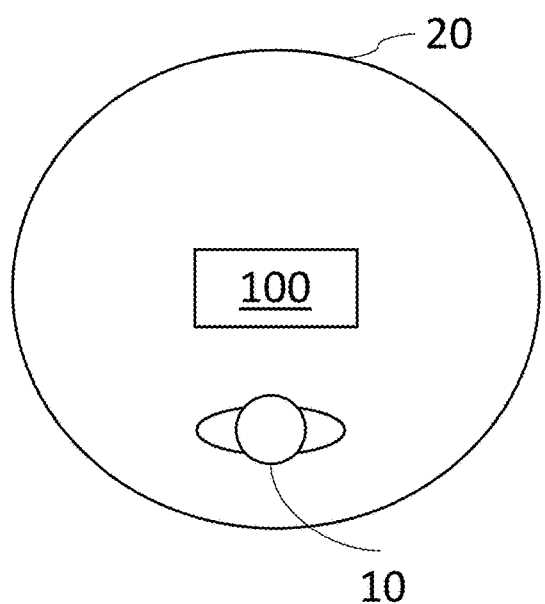
Fig. 2a  Fig. 2b

1

AUDIO DEVICE WITH ULTRASOUND MOVEMENT DETECTION

The present disclosure relates to an audio device capable of emitting ultrasound, detecting movement based on the emitted ultrasound, and to adjust one or more audio processing parameters based on detected movement.

BACKGROUND

Audio devices includes a great deal of processing of received or obtained audio signals. The processing may include removing types of distortion within the audio signals, such as noise, jammers, echo, reverberation, etc. These types of distortion may be removed to enhance the quality of the audio signal for an end user.

The processing is mainly performed in response to detecting a type of distortion within the audio signal or a change in the acoustic scene, and subsequently, trying to remove the type of distortion. The removal of the type of distortion may be performed by adapting one or more audio processing parameters based on the detected type of distortion or the change in the acoustic scene.

However, the adaption of the one or more audio processing parameters can be hard to successfully perform in real-time, e.g., during a teleconference. For example, while adapting the audio processing parameters there is a risk of an excessive amount of distortion being introduced due to bad initial guesses for adapting the audio processing parameters, or because of a slow convergence towards a set of optimal audio processing parameters. An approach to overcome this is to have a fast update rate for certain audio processing parameters, however, this may be costly for processing power, and may lead to large fluctuations within the audio processing parameters, these fluctuations may introduce distortion or otherwise lead to a varying audio quality.

Consequently, there is a need for an audio device with a more proactive approach to adapting audio processing parameters.

SUMMARY

Accordingly, there is a need for audio devices and methods with improved capabilities for adjusting one or more audio processing parameters.

According to a first aspect of the disclosure there is provided an audio device comprising, an interface, one or more first output transducers, one or more input transducers, a processor, wherein the audio device is configured to emit by the one or more first output transducers a first ultrasound signal into a first region surrounding the audio device, receive a first reflection indicative of the first ultrasound signal via the one or more input transducers, process by the processor the first reflection to determine first movement of a first object within the first region, and in response to first movement being determined, adjust by the processor one or more audio processing parameters of the audio device.

Consequently, the audio device may proactively determine a change in an acoustic environment in which the audio device is arranged, and proactively adapt to the change in the acoustic environment. The audio is thus not reliant on receiving an audio signal and analyzing the audio signal before being able to adjust audio processing parameters.

The audio device may be a speakerphone, a soundbar, or other audio teleconference equipment. In some embodiments, the audio device may be a hearable such as a headset, headphone, earphone, earbud, hearing aid, a personal sound amplification product (PSAP), an over-the-counter (OTC) audio device, a hearing protection device, a one-size-fits-all audio device, a custom audio device or another head-wearable audio device.

The audio device may be embodied in various housing styles or form factors.

The interface may comprise a wireless transceiver, also denoted as a radio transceiver, and an antenna for wireless transmission and reception of an audio signal, such as for wireless transmission of an output signal and/or wireless reception of a wireless input signal. The audio device may be configured for wireless communication with one or more electronic devices, such as another audio device, a smartphone, a tablet, a computer and/or a smart watch. The audio device optionally comprises an antenna for converting one or more wireless input audio signals to antenna output signal(s). The audio device may be configured for wireless communications via a wireless communication system, such as short-range wireless communications systems, such as Wi-Fi, Bluetooth, Zigbee, IEEE 802.11, IEEE 802.15, infra-red and/or the like. The audio device may be configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed bands, such as device-to-device millimetre-wave communications in licensed bands. In one or more example audio devices the interface of the audio device comprises one or more of: a Bluetooth interface, Bluetooth low energy interface, and a magnetic induction interface. For example, the interface of the audio device may comprise a Bluetooth antenna and/or a magnetic interference antenna. In one or more example audio devices, the interface may comprise a connector for wired communication, via a connector, such as by using an electrical cable. The connector may connect one or more microphones to the audio device. The connector may connect the audio device to an electronic device, e.g., for wired connection. The one or more interfaces can be or comprise wireless interfaces, such as transmitters and/or receivers, and/or wired interfaces, such as connectors for physical coupling The audio device comprises one or more input transducers. The one or more input transducers may comprise one or more microphones. The one or more input transducers may comprise one or more vibration sensors configured for detecting bone vibration. The one or more input transducers may be configured for converting an acoustic signal into a first electric input signal. The first electric input signal may be an analogue signal. The first electric input signal may be a digital signal. The one or more input transducers may be coupled to one or more analogue-to-digital converters configured for converting the analogue first input signal into a digital first input signal. The one or more input transducers may be communicatively connected to the processor of the audio device. The one or more input transducers may be configured to transmit a digital or an analogue signal to the processor.

The one or more input transducers may be configured to have a frequency response at ultrasonic frequencies. The one or more input transducers may be one or more ultrasonic microphones. The one or more input transducers may be configured to pick-up speech from one or more users of the audio device. The one or more input transducers may be used for picking up speech and for picking up ultrasound signals. Alternatively, the audio device may additionally comprise one or more speech input transducers configured to pick-up speech from one or more users of the audio device. Consequently, the audio device may comprise one or more input transducers configured to pick-up ultrasound signals, and one or more speech input transducers configured to pick-up speech from one or more users of the audio device.

The audio device comprises one or more first output transducers. The one or more first output transducers may be communicatively connected to the processor. The one or more first output transducers may be one or more loudspeakers. The one or more first output transducers may be configured for converting a first electric output signal into an acoustic output signal. The one or more first output transducers may be configured for converting a first electric output signal received from the processor into an acoustic output signal.

The one or more first output transducers are configured to emit signals with an ultrasonic frequency. The one or more first output transducers may be configured to have a frequency response at ultrasonic frequencies. The one or more first output transducers may be one or more ultrasonic speakers. The one or more first output transducers may be configured to output audible signals. The one or more first output transducers may be used for both outputting audible signals and for outputting ultrasound signals. In the present context audible signals may be understood as signals with a frequency within the range of 20 Hz to 20 kHz. The audio device may additionally comprise one or more speech output transducers configured to output audible sounds from the audio device. The audio device may comprise one or more input transducers configured to output ultrasound signals, and one or more speech output transducers configured to output audible signals.

In an embodiment the one or more input transducers and the one or more first output transducers may be comprised by a first ultrasonic array. The first ultrasonic array may be configured to emit and pick-up ultrasonic signals.

In the present disclosure, the term ultrasonic signals may be understood as a signal with a frequency of around 20 kHz or above 20 kHz. In the present disclosure, the term ultrasonic signals may be understood as a signal with a frequency high enough to be inaudible for a user of the audio device.

In an embodiment, the audio device may comprise one or more antennas configured for wireless communication. The one or more antennas may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz.

In an embodiment, the audio device may comprise one or more wireless communication units. The one or more wireless communication units may comprise one or more wireless receivers, one or more wireless transmitters, one or more transmitter-receiver pairs and/or one or more transceivers. At least one of the one or more wireless communication unit(s) may be coupled to the one or more antennas. The wireless communication unit may be configured for converting a wireless signal received by at least one of the one or more antennas into a second electric input signal. The audio device may be configured for wired/wireless audio communication, e.g., enabling the user to listen to media, such as music or radio, enabling the user to perform phone calls, and/or the user to participate in a teleconference.

In an embodiment, the wireless signal may originate from one or more external sources and/or external devices, such as spouse microphone devices, wireless audio transmitters, smart computers and/or distributed microphone arrays associated with a wireless transmitter. The wireless input signals may origin from another audio device.

The audio device comprises a processor. The processor may be configured for processing one or more input signals. The processing may comprise compensating for a hearing loss of the user, i.e., apply frequency dependent gain to input signals in accordance with the user's frequency dependent hearing impairment. The processing may comprise performing feedback cancelation, echo cancellation, beamforming, tinnitus reduction/masking, noise reduction, noise cancellation, speech recognition, bass adjustment, treble adjustment and/or processing of user input. The processor may be a processor, an integrated circuit, an application, functional module, etc. The processor may be implemented in a signal-processing chip or a printed circuit board (PCB). The processor may be configured to provide a first electric output signal based on the processing of the one or more electric input signals. The processor may be configured to provide one or more electric output signals. The one or more electric output signals may be based on the processing of the one or more electric input signals. The processor may be configured for processing one or more signals from the one or more input transducers. The processor may be communicatively connected to the one or more input transducers and the one or more first output transducers. The processor may be configured for generating an output electric signal and transmitting the output electric signal to the one or more first output transducers.

In an embodiment, the wireless communication unit may be configured for converting one or more electric output signals from the processor into a wireless output signal. The wireless output signal may comprise synchronization data. The wireless communication unit may be configured for transmitting the wireless output signal via at least one of the one or more antennas.

In an embodiment, the audio device may comprise a digital-to-analogue converter configured to convert one or more electric output signals into an analogue signal. In an embodiment, the one or more first output transducers comprises a digital-to-analogue converter configured to convert one or more electric output signals from the processor into an analogue signal to be emitted by the one or more first output transducers.

In an embodiment, the audio device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The audio device may comprise a memory, including volatile and non-volatile forms of memory.

The audio device may be configured for audio communication, e.g., enabling the user to listen to media, such as music or radio, and/or enabling the user to perform phone calls.

The audio device may comprise one or more antennas for radio frequency communication.

The one or more first output transducers are configured to emit a first ultrasound signal into a first region surrounding the audio device. The one or more first output transducers may receive the first ultrasound signal from the processor of the audio device. The first ultrasound signal may be generated by the processor of the audio device. The first ultrasound signal when emitted by the one or more first output transducers may be converted/transduced to ultrasound waves travelling in the first region.

The first ultrasound signal may comprise one or more modulation parameters indicative of the first ultrasound signal to be emitted by the one or more first output transducers. The one or more first output transducers may be configured to emit the first ultrasound signal into the first region with a first set of modulation parameters. The one or more first output transducers may be configured to emit the first ultrasound signal according to the one or more modulations parameters. The one or more modulation parameters may be determined by the processor of the audio device. The one or more modulation parameters may be determined by a user of the audio device. The one or more modulation parameters may be predetermined. The one or more modulation parameters may be predetermined during a tuning process of the audio device. The first set of modulation parameters may comprise information regarding a centre frequency, a ramp time, an on time, a taper time, a duty cycle, an off-period and so forth. The first ultrasound signal may comprise one or more modulation parameters for creating one or more sidebands in the emitted first ultrasound signal. The first ultrasound signal may be emitted with a ramp time of 4 ms, a taper time of 4 ms, a duty cycle of 50%, and an off-period of 8 ms. The off-period corresponding to the time between ultrasound emissions, e.g., the time between the first ultrasound signal being emitted and the next ultrasound signal being emitted. The ramp time corresponding to a period where the power of the ultrasound emitted is increased. The on-time corresponding to the duration for which the first ultrasound signal is emitted, hence, in the presented example the first ultrasound signal would have an on-time of 8 ms. The taper time corresponding to a period where the power of the ultrasound emitted is decreased. The duty cycle corresponding to the percent of time the ultrasound is being emitted during the on-time.

The first region surrounding the audio device may be defined as an area or volume proximate the audio device. The first region may extend from the one or more first output transducer and according to a spread of the one or more first output transducer, e.g., the one or more first output transducers may be configured to emit with a spread of 0 degrees-45 degrees, 0 degrees-90 degrees, 0 degrees-180 degrees, 0 degrees-270 degrees, or 0 degrees-360 degrees. Ultrasonic signals are highly directional in their nature, thus, allowing for predetermining the spread of the one or more first output transducers. The spread of the one or more first output transducers may be configurable by the processor of the audio device. The first region may be defined by the spread of the emitted first ultrasound signal.

The one or more first output transducers may be configured to emit ultrasound signals continuously or intermittently.

The first reflection indicative of the first ultrasound signal may be a reflection of the emitted first ultrasound signal reflected off an object in the first region. The one or more input transducers may receive a plurality of first reflections indicative of the first ultrasound signal. The plurality of first reflections indicative of the first ultrasound signal may be a plurality of reflections of the emitted first ultrasound signal reflected off a plurality of objects in the first region. The processor may store the first reflection in a memory of the audio device. The processor may store a plurality of previously received first reflections in a memory of the audio device The one or more input transducers may be configured to receive first reflections indicative of the first ultrasound signal continuously or intermittently. The processor may store one or more received first reflections, consequently, the processor may store one or more previously receiving first reflections in a memory associated with the audio device.

To determine first movement of the first object within the first region may comprise to apply the well-known formula for doppler shift, where if one assumes the audio device is a stationary object, it may be expressed as:

$$f = \left(\frac{c}{c \pm v_s}\right) f_0$$

Where c is the speed of sound, $v_s$ is the speed of an object off which the emitted ultrasound signal is reflected, $f_0$ is the frequency of the emitted ultrasound signal, and f is the frequency of a received reflection. From the formula it can clearly be seen that a stationary object will not cause any frequency shift, while an object moving relative to the audio device will give rise to either a positive or negative frequency shift. Consequently, by assuming a value for the speed of sound, knowing the frequency of the emitted ultrasound signal, and observing the frequency of the received reflections the speed of an object may be determined.

The first object may be a user of the audio device. The first object may be an inanimate object in the first region, such as a chair, or a table.

The processor may adjust one or more audio processing parameter associated with a digital signal processing module, e.g., the processor may adjust one or more audio processing parameters associated with an echo controller, a noise reduction module, and/or a beam former. The one or more audio processing parameters by one or more filter coefficients or similar. The processor may adjust one or more digital audio processing parameters. The processor may adjust one or more analog audio processing parameters.

The audio device may comprise a beamformer, and/or other signal processing modules such as echo controller, or a noise reduction module. The audio device may comprise a voice activity detection module. The audio device may comprise a direction of arrival module for determining a direction of arrival module for determining a direction of arrival of audio picked by the one or more input transducers.

By adjust in the present disclosure it should be understood as encompassing to modify, to change, or to set one or more audio processing parameters.

In an embodiment the one or more audio processing parameters comprises one or more parameters associated with a beamformer of the audio device.

The one or more parameters associated with a beamformer may comprise one or more of the following an update rate of the beamformer, a beamformer pattern, a beamformer direction, fixing or freezing one or more beamformer former parameters, a beamformer filter, etc. The one or more parameters associated with a beamformer may comprise turning off the beamformer if no first movement is determined. The one or more parameters associated with a beamformer may comprise activating the beamformer if first movement is determined.

A beamformer is highly dependent on the speaker's position, as it will try to converge on the speaker's position, thereby enhancing speech from the user. However, beamformers may risk drifting over time, e.g., if a jammer speaker is picked-up the beamformer may try to converge onto the jammer speaker, in the present disclosure the processor may fixate beamformer weights, and only allow for updating of the beamformer weights in response to determining movement of an object or determining movement of an object above a movement threshold. Consequently, it may assure if a speaker is stationary or almost stationary that the beamformer does not start to drift in response to picking up a jammer speaker.

In an embodiment the one or more audio processing parameters associated with a beamformer of the audio device comprises a beamformer update rate.

Consequently, processing power may be saved and fluctuations in audio processing parameters may be minimized in situations where a high update rate is not required, and vice versa in situations where a high update rate is required, e.g., in a dynamic environment with movement, the update rate may be kept high to properly track the changes in the environment.

The beamformer update rate may comprise a forgetting factor of covariance matrices for speech and noise. When no first movement is determined the forgetting factor may be set to a lower value and when first movement is determined the forgetting factor may be set to a higher value. By having adaptive covariance matrices, it may reduce the risk of drifting of the beamformer over time due to jammers, noise, or other artefacts.

The beamformer update rate may comprise a forgetting factor of covariance matrices for each speaker using the audio device and noise.

The processor may in response to determining first movement of the first object increase the beamformer update rate. Hence, it may enable the audio device to predict movement of a speaker, and to properly prepare for converging on the new position of the speaker by increasing the beamformer update rate. If the beamformer update rate has been increased, it may return to a lower pre-set value after a period with no detection of first movement within the first region.

The processor may in response to determining no first movement within the first region decrease the beamformer update rate. Hence, it may enable the audio device to save processing power, and to avoid fluctuations in the beamformer, e.g., by the beamformer trying to converge on a jammer. By decreasing the beamformer rate it may be understood as setting the update rate to zero, i.e., stopping updating the beamformer, or decreasing the value for the beamformer update rate.

In an embodiment the one or more audio processing parameters comprises one or more parameters associated with an echo controller of the audio device.

The one or more parameters associated with an echo controller may comprise one or more of the following an update rate of the echo controller, one or more filter coefficients associated with the echo controller, etc. The echo controller may comprise an echo canceller for cancelling linear echo and/or an echo suppressor for suppressing non-linear echo.

An echo controller is highly dependent on the acoustic environment in which the audio device is situated. The acoustic environment may change if people, chairs, table, or other objects are moved around. The echo controller works in part by determining an impulse response of the surrounding environment, and cancelling echoes based on the determined impulse response. The impulse response is determined by analyzing an obtained audio signal. However, movement in the environment may lead to changes in the impulse response, thus, requiring the echo controller to redetermine the impulse response. However, the echo controller may not be able to react fast enough to changes in the acoustic environment, thus, risking echo leak, i.e., the far-end audio signal leaking into the near-end audio signal, or other distortions caused by echo.

However, by controlling one or more parameters associated with the echo controller in response to determined first movement, it may allow the echo controller to prepare for a change in the acoustic environment.

In an embodiment the one or more audio processing parameters associated with an echo controller of the audio device comprises a threshold for near end speech classification.

Consequently, echo leak and other distortion caused by echo may be avoided by increasing the threshold for near-end speech classification, in situations where the acoustic environment is dynamic. Thus, reducing the risk of wrongfully classifying an echo signal as a near end speech signal.

The processor may in response to determining movement of a first object increase the threshold for near end speech classification. Hence, it may enable the audio device to prepare for a dynamic acoustic environment, where echo control may be hard to properly perform. If the threshold for near end speech classification has been increased previously, the threshold for near end speech classification may return to a lower pre-set value after a period of time with no detection of movement within the first region.

The processor may in response to determining no movement within the first region decrease the threshold for near end speech classification. Hence, it may enable the audio device to avoid misclassifying near-end speech because of a too aggressive approach in suppressing echo.

In an embodiment, to process the first reflection to determine first movement of the first object within the first region comprises to determine a centre shift based on a predetermined centre frequency of the first ultrasound signal.

As shown above, the centre shift may be translated to a speed of movement of the first object via the doppler formula. Consequently, a simple and efficient approach is used for determining movement of the first object.

The centre frequency may be above or around 20 kHz, such as 20 kHz, 22 kHz, 30 kHz, 40 kHz, or 50 kHz.

The centre shift may be understood as a frequency shift of the emitted first ultrasound signal being reflected of a first object. The centre shift may be determined by analyzing one or more frequencies next to the centre frequency and determining a power of the one or more frequencies next to the centre frequency. The centre shift may be determined by analyzing one or more frequencies next to the centre frequency and determining a magnitude of the one or more frequencies next to the centre frequency. The centre shift may be determined by analyzing one or more frequencies next to the centre frequency and determining a change in power of the one or more frequencies next to the centre frequency. The centre shift may be determined by analyzing one or more frequencies next to the centre frequency and determining a change in magnitude of the one or more frequencies next to the centre frequency. The one or more frequencies next to the centre frequency may be determined as one or more frequency bins. The one or more frequency bins next to the centre frequency may be predetermined. A centre shift may be determined for each of the one or more frequency bins next to the centre frequency.

The centre frequency may be predetermined by the processor of the audio device. A user of the audio device may determine the centre frequency and input the determined centre frequency to the audio device.

By the centre frequency being predetermined it is to be understood as the centre frequency of the first ultrasound signal being a known entity before being outputted by the first one or more output transducers.

In an embodiment, to process the first reflection to determine first movement of the first object within the first region comprises to compare the centre shift to a lower movement threshold, and wherein if the centre shift exceeds the lower movement threshold determine first movement of the first object within the first region.

Consequently, minor movements in the first region may be sorted away, e.g., fidgeting, or minor movements of a user of the audio device may not qualify as movement requiring adjustment of the one or more audio processing parameters. False positives may also be sorted away, thus, avoiding excessive or even wrongful adjustment of the audio processing parameters. Noise in the measurement may also be sorted away, thus, avoiding it leading to a positive determination of first movement.

The lower movement threshold may be expressed as a minimum power of the centre shift required to determine the first movement. The lower movement threshold may be expressed as a minimum magnitude of the centre shift required to determine the first movement. The lower movement threshold may be expressed as a minimum change in power of the centre shift required to determine the first movement. The lower movement threshold may be expressed as a minimum change in magnitude of the centre shift required to determine the first movement. The lower movement threshold may be adjustable by a user of the audio device. The lower movement threshold may be predetermined. The lower movement threshold may be predetermined during a tuning process of the audio device.

The lower movement threshold may be determined as a minimum change over time in magnitude and/or power in one or more frequency bins.

The processor may be configured to compare the centre shift to the lower movement threshold, and wherein if the centre shift does not exceed the lower movement threshold determine no first movement of the first object within the first region.

In an embodiment to process the first reflection to determine first movement of the first object within the first region comprises to compare the centre shift to a higher movement threshold, and wherein if the centre shift exceeds the higher movement threshold determine no movement of the first object within the first region.

The audio device may be arranged in an environment with other ultrasound sources. Ultrasound signals from other ultrasound sources may be picked up by the one or more input transducers. The ultrasound signals picked up from other sources may lead to an erroneous determination of the first movement. One way to avoid making an erroneous determination of the first movement is by introducing a higher movement threshold, consequently, ultrasound signals picked up from other ultrasound sources may be sorted away.

The higher movement threshold may be expressed as a maximum power which if exceeded leads to no first movement being determined. The higher movement threshold may be expressed as a maximum magnitude which if exceeded leads to no first movement being determined. The higher movement threshold may be expressed as a maximum change in power which if exceeded leads to no first movement being determined. The higher movement threshold may be expressed as a maximum change in magnitude which if exceeded leads to no first movement being determined. The higher movement threshold may be adjustable by a user of the audio device. The higher movement threshold may be predetermined. The higher movement threshold may be predetermined during a tuning process of the audio device.

The higher movement threshold may be determined as a maximum change over time in magnitude and/or power in one or more frequency bins.

In an embodiment the processor may be configured to compare the centre shift to both the higher movement threshold and lower movement threshold, where the higher movement threshold has a higher value than the lower movement threshold.

In an embodiment the processor may be configured to compare the centre shift to both the higher movement threshold and lower movement threshold, where first movement is only determined if the centre shift is below the higher movement threshold and above the lower movement threshold.

In an embodiment to process the first reflection to determine first movement of a first object within the first region comprises to:
  determine a max speed for which movement of the first object is determined,
  determine an analysis frequency range in which the centre frequency shift is determined based on the max speed movement and the predetermined centre frequency.

Consequently, the number of frequencies needed to be analyzed is limited, therefore saving processing power, and limiting the risk of interference from other ultrasound sources.

The max speed is to be understood as the max speed the object within the first region the first object can travel with for which first movement will still be determined.

As can be seen above from Doppler's formula, speed may be translated to a change in frequency, consequently, a max speed may be translated to a frequency range to be analyzed.

The analysis frequency range may comprise a continuous range. The analysis frequency range may comprise a plurality of frequency bins.

The max speed may be adjustable by a user of the audio device. The max speed may be predetermined. The max speed may be predetermined during the tuning process of the audio device.

In an embodiment to process the first reflection to determine first movement of the first object within the first region comprises to determine a plurality of side shifts in a number of predetermined sidebands of the first ultrasound signal, such as 2-20 sidebands, preferably 4-12 sidebands.

Consequently, a more robust movement detection is achieved as not only the centre shift is used in determining first movement.

The sidebands may be predetermined according to one or more modulation parameters used when emitting the first ultrasound signal.

As shown above, the side shift may be translated to a speed of movement of the first object via the doppler formula. Consequently, a simple and efficient approach is used for determining movement of the first object.

The frequencies of the number of predetermined sidebands may be determined based on the centre frequency and the one or more modulation parameters. The centre frequency may in embodiments comprising one or more sidebands also be viewed as a carrier frequency.

By the side frequency being predetermined it is to be understood as the side frequency of the first ultrasound signal being a known entity before being outputted by the first one or more output transducers.

A side shift may be understood as a frequency shift of a sideband of the emitted first ultrasound signal being reflected of a first object. The side shift may be determined by analyzing one or more frequencies next to the associated sideband and determining a power of the one or more frequencies next to the associated sideband. The side shift may be determined by analyzing one or more frequencies next to the associated sideband and determining a magnitude of the one or more frequencies next to the associated sideband. The side shift may be determined by analyzing one or more frequencies next to the associated sideband and determining a change in power of the one or more frequencies next to the associated sideband. The side shift may be determined by analyzing one or more frequencies next to the associated sideband and determining a change in magnitude of the one or more frequencies next to the associated sideband. The one or more frequencies next to the associated sideband may be determined as one or more frequency bins. The one or more frequency bins next to the sideband may be predetermined. A side shift may be determined for each of the one or more frequency bins next to the sideband.

In an embodiment, to process the first reflection to determine first movement of the first object within the first region comprises to compare the plurality of side shifts to a lower movement threshold, and wherein if the plurality of side shifts exceeds the lower movement threshold determine first movement of the first object within the first region.

In an embodiment, to process the first reflection to determine first movement of the first object within the first region comprises to compare the plurality of side shifts and the centre shift to a lower movement threshold, and wherein if the plurality of side shifts and the centre shift exceeds the lower movement threshold determine first movement of the first object within the first region.

In an embodiment, to process the first reflection to determine first movement of the first object within the first region comprises to compare the plurality of side shifts and the centre shift to a lower movement threshold, and wherein if more than a fourth or half of the plurality of side shifts and the centre shift exceeds the lower movement threshold determine first movement of the first object within the first region.

In an embodiment, to process the first reflection to determine first movement of the first object within the first region comprises to compare the plurality of side shifts to a lower side movement threshold, and wherein if more than a fourth, half, or all of the plurality of side shifts exceeds the lower side movement threshold determine first movement of the first object within the first region.

In an embodiment, to process the first reflection to determine first movement of the first object within the first region comprises to compare the plurality of side shifts to a lower side movement threshold, and wherein if more than a fourth, half, or all of the plurality of side shifts exceeds the lower side movement threshold and the centre shift exceed the lower movement threshold determine first movement of the first object within the first region.

The lower side movement threshold may be the same as the lower movement threshold. Alternatively, the lower side movement threshold may be a threshold value associated only with the sidebands, while the lower movement threshold is associated with the centre frequency. In other embodiments, the lower movement threshold may also be collective threshold for which the sum of the side shifts and the centre shift must exceed for first movement to be determined.

The lower side movement threshold may be expressed as a minimum power required to determine the first movement. The lower side movement threshold may be expressed as a minimum magnitude required to determine the first movement. The lower side movement threshold may be expressed as a minimum change in power required to determine the first movement. The lower side movement threshold may be expressed as a minimum change in magnitude required to determine the first movement. The lower side movement threshold may be adjustable by a user of the audio device. The lower side movement threshold may be predetermined. The lower side movement threshold may be predetermined during a tuning process of the audio device.

The lower side movement threshold may be determined as a minimum change over time in magnitude and/or power in one or more frequency bins.

The processor may be configured to compare the plurality of side shifts to the lower side movement threshold, and wherein if the plurality of side shifts does not exceed the lower side movement threshold determine no first movement of the first object within the first region. The processor may be configured to determine no first movement if not all, not half or not a fourth of the plurality of side shifts exceed the lower side movement threshold. The processor may be configured to determine no first movement if not all, not half or not a fourth of the plurality of side shifts and the centre shift exceed the lower movement threshold.

In an embodiment to process the first reflection to determine first movement of the first object within the first region comprises to compare the plurality of side shifts to a higher movement threshold, and wherein if the plurality of side shift exceeds the higher movement threshold determine no movement of the first object within the first region.

In an embodiment, to process the first reflection to determine first movement of the first object within the first region comprises to compare the plurality of side shifts and the centre shift to a higher movement threshold, and wherein if the plurality of side shifts and the centre shift exceeds the higher movement threshold determine no first movement of the first object within the first region.

In an embodiment, to process the first reflection to determine first movement of the first object within the first region comprises to compare the plurality of side shifts and the centre shift to a higher movement threshold, and wherein if more than a fourth or half of the plurality of side shifts and the centre shift exceeds the higher movement threshold determine no first movement of the first object within the first region.

In an embodiment, to process the first reflection to determine first movement of the first object within the first region comprises to compare the plurality of side shifts to a higher side movement threshold, and wherein if more than a fourth, half, or all of the plurality of side shifts exceeds the higher side movement threshold determine no first movement of the first object within the first region.

In an embodiment, to process the first reflection to determine first movement of the first object within the first region comprises to compare the plurality of side shifts to a higher side movement threshold, and wherein if more than a fourth, half, or all of the plurality of side shifts exceeds the higher side movement threshold and the centre shift exceed the higher movement threshold determine no first movement of the first object within the first region.

The higher side movement threshold may be the same as the higher movement threshold. Alternatively, the higher side movement threshold may be a threshold value associated only with the sidebands, while the higher movement threshold is associated with the centre frequency. In other embodiments, the higher movement threshold may also be collective threshold for which if the sum of the side shifts and the centre shift exceeds no first movement is determined.

The higher side movement threshold may be expressed as a maximum power for which first movement is determined. The higher side movement threshold may be expressed as a maximum magnitude for which the first movement is determined. The higher side movement threshold may be expressed as a maximum change in power for which the first movement is determined. The higher side movement threshold may be expressed as a maximum change in magnitude for which the first movement is determined. The higher side movement threshold may be adjustable by a user of the audio device. The higher side movement threshold may be predetermined. The higher side movement threshold may be predetermined during a tuning process of the audio device.

The higher side movement threshold may be determined as a maximum change over time in magnitude and/or power in one or more frequency bins for first movement to be determined.

In an embodiment to process the first reflection to determine first movement of a first object within the first region comprises to:
  determine a max speed for which movement of the first object is determined,
  determine a plurality of side analysis frequency ranges in which the plurality of side frequency shifts is determined based on the max speed movement.

In an embodiment to process the first reflection to determine first movement of a first object within the first region comprises to:
  determine a max speed for which movement of the first object is determined,
  determine a centre analysis frequency range in which the centre shift is determined based on the max speed movement.
  determine a plurality of side analysis frequency ranges in which the plurality of side frequency shifts is determined based on the max speed movement.

In an embodiment to process the first reflection to determine first movement of the first object within the first region comprises using a Goertzel algorithm.

The Goertzel algorithm have proven effective when analyzing a small number of frequency components, when a full spectrum analysis is not needed. In the present case, to determine first movement a full spectrum frequency analysis may not be needed, hence, it may be advantageous to apply a Goertzel algorithm in processing the received first reflection. The Goertzel algorithm may be a Goertzel algorithm for audio frequency analysis.

In an embodiment the audio device comprises one or more second output transducers, wherein the audio device is configured to:
  emit by the one or more second output transducers a second ultrasound signal into a second region surrounding the audio device, wherein the second region differs from the first region,
  receive a second reflection indicative of the second ultrasound signal via the one or more input transducers,
  process by the processor the second reflection to determine second movement of a second object within the second region,
  adjust by the processor one or more audio processing parameters of the audio device based on the determined first movement and/or the determined second movement.

In an embodiment the audio device comprises one or more second output transducers, wherein the audio device is configured to:
  emit by the one or more second output transducers a second ultrasound signal into a second region surrounding the audio device, wherein the second region differs from the first region,
  receive a second reflection indicative of the second ultrasound signal via the one or more input transducers,
  process by the processor the second reflection to determine second movement of a second object within the second region,
  adjust by the processor one or more audio processing parameters of the audio device based on the determined first movement and/or the determined second movement.

Consequently, the audio device may monitor regions surrounding the audio separately, and react separately to the event in the different regions, thereby, avoiding changing all audio parameters in response to an event, which may only be relevant for part of the audio parameters.

The one or more second output transducers may be identical to or differ from the one or more first output transducers. The one or more second output transducers may be communicatively connected to the processor. The one or more second output transducers may be configured for converting a second electric output signal into an acoustic output signal. The one or more second output transducers may be configured for converting a second electric output signal received from the processor into an acoustic output signal.

In an embodiment the one or more input transducers and the one or more second output transducers may be comprised by an ultrasonic array. The ultrasonic array may be configured to emit and pick-up ultrasonic signals.

In an embodiment the one or more input transducers, the one or more first output transducers, and the one or more second output transducers may be comprised by an ultrasonic array. The ultrasonic array may be configured to emit and pick-up ultrasonic signals.

In an embodiment the audio device comprises a first ultrasonic array comprising one or more first input transducers and the one or more first output transducers, and a second ultrasonic array comprising one or more second input transducers and the one or more second output transducers.

The one or more second output transducers are configured to emit a second ultrasound signal into a second region surrounding the audio device. The one or more second output transducers may be configured to emit the second ultrasound signal into the second region with a second set of modulation parameters. The second set of modulation parameters may be identical to or differ from the first set of modulation parameters. The second set of modulation parameters may comprise information regarding a centre frequency, a ramp time, an on time, a taper time, a duty cycle, an off-period and so forth. The second set of modulation parameters may have a centre frequency differing from the first set of modulation parameters, while keeping the other modulation parameters identical to the first set of modulation parameters.

The second region surrounding the audio device may be defined as an area or volume proximate the audio device.

The second region may extend from the one or more second output transducer and according to a spread of the one or more second output transducer, e.g., the one or more second output transducers may be configured to emit with a spread of 0 degrees-45 degrees, 0 degrees-90 degrees, 0 degrees-180 degrees, 0 degrees-270 degrees, or 0 degrees-360 degrees. The second region may overlap the first region. The second region may not overlap the first region.

The processor may process the second reflection in a corresponding manner as the first reflection to determine second movement.

In some embodiment the audio device comprises one or more third output transducers, one or more one or more fourth output transducers, and so forth. The one or more third output transducers, and the one or more one or more fourth output transducers, and so forth may be configured to act in a corresponding manner as the one or more first output transducers and the one or more second output transducers.

In an embodiment the audio device is configured to:
  determine by the processor a first set of audio processing parameters associated with the first region,
  determine by the processor a second set of audio processing parameters associated with the second region,
  if first movement is determined, adjust the first set of audio processing parameters,
  if second movement is determined, adjust the second set of audio processing parameters.

The first set of audio processing parameters and the second set of audio parameter may each comprise one or more audio processing parameters associated with a digital signal processing block of the audio device.

In an embodiment the audio device is configured to:
  determine by the processor a first set of beamformer parameters associated with the first region,
  determine by the processor a second set of beamformer parameters associated with the second region,
  if first movement is determined, adjust the first set of beamformer parameters,
  if second movement is determined, adjust the second set of beamformer parameters.

Consequently, in the event of a change in the acoustic situation surrounding the audio device, the audio device may keep already determined beamformer parameters which are still useable, while adapting other beamformer parameters to reflect the new situation. This may especially be advantageous if the first set of beamformer parameters have already converged on a speaker within the first region, the first set of beamformer parameters may then be kept constant if no first movement is detected in the first region, even if another speaker in the second region starts moving around.

The first set of beamformer parameters may comprise one or more of the following an update rate of the beamformer, a beamformer pattern, a beamformer direction, fixing or freezing one or more beamformer former parameters, a beamformer filter, etc.

The second set of beamformer parameters may comprise one or more of the following an update rate of the beamformer, a beamformer pattern, a beamformer direction, fixing or freezing one or more beamformer former parameters, a beamformer filter, etc. In an embodiment the audio device is configured to:
  determine by the processor a first set of beamformer parameters for the first object in the first region,
  determine by the processor a second set of beamformer parameters for the second object in the second region,
  if first movement is determined, adjust by the processor the first set of beamformer parameters,
  if second movement is determined, adjust by the processor the second set of beamformer parameters.

In an embodiment the audio device is configured to:
  if first movement is determined, determine by the processor one or more predetermined beamformer parameters associated with the first region, and in response to speech in the first region being detected by the audio device, determine one or more beamformer parameters based on the one or more predetermined beamformer parameters associated with the first region,
  if second movement is determined, determine by the processor one or more predetermined beamformer parameters associated with the second region, and in response to speech in the second region being detected by the audio device, determine one or more beamformer parameters based on the one or more predetermined beamformer parameters associated with the second region.

The predetermined beamformer parameters may comprise one or more of the following an update rate of the beamformer, a beamformer pattern, a beamformer direction, fixing or freezing one or more beamformer former parameters, a beamformer filter, etc.

The predetermined beamformer parameters may be predetermined during a tuning process of the audio device. The predetermined beamformer parameters may be predetermined by a user of the audio device. The predetermined beamformer parameters may be adjustable by a user of the audio device. The predetermined beamformer parameters may be predetermined based on a distribution of the first and second output transducers on the audio device. The predetermined beamformer parameters may be fixed beamformed patterns based on the geometry of the audio device and/or the spread of the first output transducers and the second output transducer.

Speech may be determined via a voice activity detection module comprised by the audio device. The voice activity module may be a digital signal processing block, which may analyze one or more audio signals obtained by the one or more input transducers to determine whether speech is present in the one or more audio signals.

The direction of arrival of determined speech may be determined by a direction of arrival module comprised by the audio device. The direction of arrival of speech may be compared by the processor to the first region and the second region, to determine whether determined speech is detected in the first region or the second region. The direction of arrival module may be a digital signal processing block, which may analyze one or more audio signals obtained by the one or more input transducers to determine a direction of arrival of the one or more audio signals.

Consequently, the beamformer of the audio device may be able to faster converge on persons within either the first region or the second region as the beamformer does not have to start from nothing.

BRIEF DESCRIPTION OF THE DRAWINGS

The above and other features and advantages of the present disclosure will become readily apparent to those skilled in the art by the following detailed description of example embodiments thereof with reference to the attached drawings, in which:

FIG. 1 is a block diagram of an audio device according to a first embodiment of the present disclosure.

FIGS. 2a and 2b are schematic diagram of an audio device according to the first embodiment of the present disclosure placed in an acoustic environment with a moving first object and non-moving first object, respectively.

DETAILED DESCRIPTION

Figure 3:
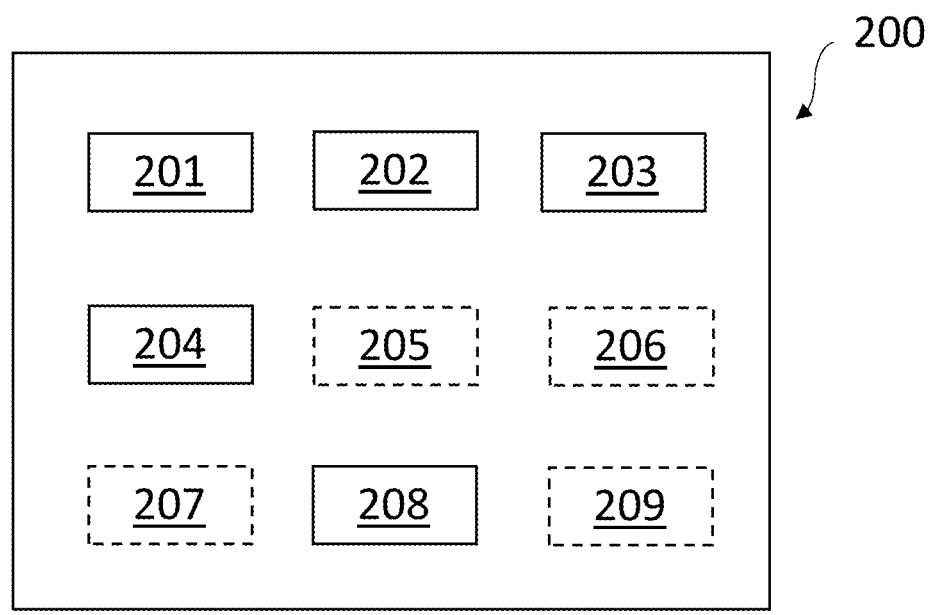
FIG. 3 is a block diagram of an audio device according to a second embodiment of the present disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. In the figures features of the invention may be created with dotted lines, these features are to be construed as optional features for that embodiment.

Referring initially to FIG. 1 showing a block diagram of an audio device 100 according to the first embodiment of the present disclosure. The audio device 100 comprises an interface 101, one or more first output transducers 102, one or more input transducers 103, and a processor 104. The audio device 100 may further comprise a memory 105 communicatively connected with the processor 104. The audio device 100 may further comprise one or more speech input transducers 106 for picking-up speech from one or more users of the audio device 100. The audio device 100 may further comprise one or more speech output transducers 107 for outputting audible signals to one or more users of the audio device 100. The audio device 100 may be a speakerphone, a soundbar, or other audio conference equipment.

The one or more first output transducers 102 are configured to emit a first ultrasound signal into a first region surrounding the audio device 100. The one or more first output transducers 102 may be configured to emit the first ultrasound signal according to a first set of modulation parameters. The one or more first output transducers 102 may be communicatively connected to the processor 104 and configured to receive the first ultrasound signal from the processor 104. The processor 104 may generate the first ultrasound signal and the first set of modulation parameters for emitting the first ultrasound signal. The first set of modulation parameters may be comprised in the first ultrasound signal.

The one or more input transducers 103 are configured to receive a first reflection indicative of the first ultrasound signal. The one or more input transducers 103 may be communicatively connected to the processor 104 and configured to transmit the received first reflection to the processor 104.

The one or more input transducers 103 and the one or more first output transducers 102 may be comprised in an ultrasonic array.

The processor 104 is configured to process the first reflection to determine the first movement of a first object within the first region. Processor 104 is configured to, in response to the first movement being determined, adjust one or more audio processing parameters of the audio device 100. The one or more audio processing parameters 100 may be associated with one or more digital signal processing modules comprised by the audio device 100. The audio device 100 may comprise a beamformer module. The audio device 100 may comprise an echo controller module. The audio device may comprise a voice activity detection module. The audio device 100 may comprise a voice activity detection module. The audio device 100 may comprise a noise reduction module.

The one or more audio processing parameters may comprise one or more parameters associated with a beamformer of the audio device 100. The one or more audio processing parameters may comprise one or more parameters associated with an echo controller of the audio device 100. The one or more audio processing parameters may comprise a beamformer update rate. The one or more audio processing parameters may comprise a threshold for near end speech classification.

Referring to FIGS. 2a and 2b showing schematic diagrams of an audio device 100 according to the first embodiment of the present disclosure placed in an acoustic environment with a moving first object 10 and non-moving first object 10, respectively. In FIG. 2a the first object 10 is a user 10 of the audio device 100. In the shown example, the one or more first output transducers 102 are configured to emit the first ultrasound signal with a spread of 360 degrees, consequently, the emitted ultrasound signal covers all around the first audio device 100 and form a first region 20 in which movement may be detected. The user 10 is moving relative to the audio device 100 within the first region 20, in which the audio device 100 is emitting a first ultrasound signal into via the one or more first output transducers 102. The audio device 100 is then able to determine first movement of the user 10, by processing the first reflection indicative of the first ultrasound signal received by the one or more input transducers 103. The processor 104 of the audio device 100 may in response to determining first movement, adjust one or more audio processing parameters of the audio device 100. In FIG. 2b the user 10 is standing still, consequently, no first movement is determined, and the processor 104 of the audio device 100 will not adjust the one or more audio processing parameters.

Referring to FIG. 3 showing a block diagram of an audio device 200 according to a second embodiment of the present disclosure. The audio device 200 comprises an interface 201, one or more first output transducers 202, one or more input transducers 203, a processor 204, and one or more second output transducers 208. The audio device 200 may further comprise a memory 205 communicatively connected with the processor 204. The audio device 200 may further comprise one or more speech input transducers 206 for picking-up speech from one or more users of the audio device 200. The audio device 200 may further comprise one or more speech output transducers 207 for outputting audible signals to one or more users of the audio device 200. The audio device 200 may further comprise one or more second input transducers 209. The audio device 200 may be a speakerphone, a soundbar, or other audio conference equipment. The one or more input transducers 203 may be one or more first input transducers 203 associated with the one or more first output transducers 202, and the one or more second input transducers 209 may associated with the one or more second output transducers 208. The first input transducers 203 and the one or more first output transducers 202 may form a first ultrasonic array, and the one or more second input transducers 209 and the one or more second output transducers 208 may form a second ultrasonic array.

The one or more first output transducers 202 are configured to emit a first ultrasound signal into a first region surrounding the audio device 200. The one or more first output transducers 202 may be configured to emit the first ultrasound signal according to a first set of modulation parameters. The one or more first output transducers 202 may be communicatively connected to the processor 204 and configured to receive the first ultrasound signal from the processor 204. The processor 204 may generate the first ultrasound signal and the first set of modulation parameters for emitting the first ultrasound signal. The first set of modulation parameters may be comprised in the first ultrasound signal.

The one or more second output transducers 208 are configured to emit a second ultrasound signal into a second region surrounding the audio device 200. The one or more second output transducers 208 may be configured to emit the second ultrasound signal according to a second set of modulation parameters. The one or more second output transducers 208 may be communicatively connected to the processor 204 and configured to receive the second ultrasound signal from the processor 204. The processor 204 may generate the second ultrasound signal and the second set of modulation parameters for emitting the second ultrasound signal. The second set of modulation parameters may be comprised in the second ultrasound signal.

The one or more input transducers 203 are configured to receive a first reflection indicative of the first ultrasound signal. The one or more input transducers 203 may be communicatively connected to the processor 204 and configured to transmit the received first reflection to processor 204.

The one or more input transducers 203 may be configured to receive a second reflection indicative of the second ultrasound signal. The one or more input transducers 203 may be configured to transmit the received second reflection to processor 204. Alternatively, the one or more second input transducers 209 may be configured to receive the second reflection indicative of the second ultrasound signal. The one or more second input transducers 209 may be communicatively connected to the processor 204 and configured to transmit the received second reflection to processor 204.

The processor 204 is configured to process the first reflection to determine the first movement of a first object within the first region. The processor 204 is configured to, in response to the first movement being determined, adjust one or more audio processing parameters of the audio device 200.

The processor 204 is configured to process the second reflection to determine the second movement of a second object within the second region. The processor 204 is configured to, in response to the second movement being determined, adjust one or more audio processing parameters of the audio device 200.

The one or more audio processing parameters 200 may be associated with one or more digital signal processing modules comprised by the audio device 200. The audio device 200 may comprise a beamformer module. The audio device 200 may comprise an echo controller module. The audio device may comprise a voice activity detection module. The audio device 200 may comprise a voice activity detection module. The audio device 200 may comprise a noise reduction module.

The one or more audio processing parameters may comprise one or more parameters associated with a beamformer of the audio device 200. The one or more audio processing parameters may comprise one or more parameters associated with an echo controller of the audio device 200. The one or more audio processing parameters may comprise a beamformer update rate. The one or more audio processing parameters may comprise a threshold for near end speech classification.

Figure 4:
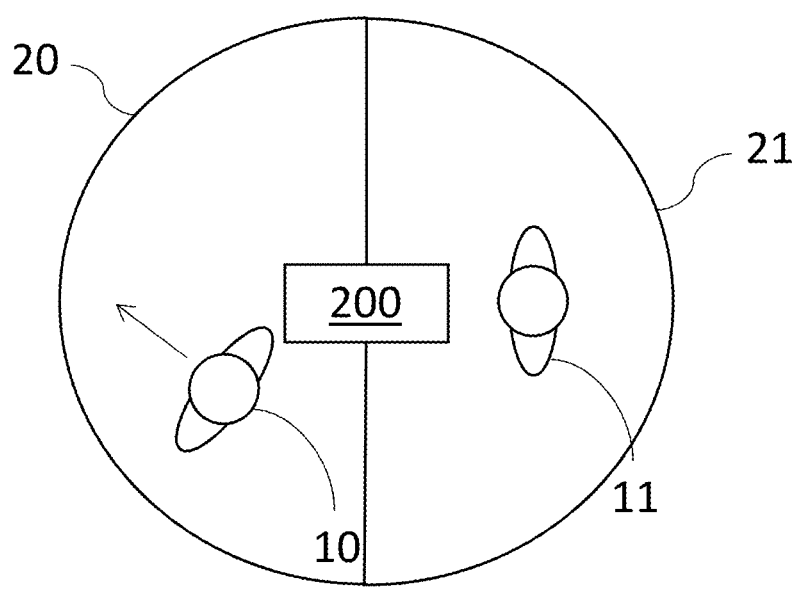
FIG. 4 is a schematic diagram of an audio device according to the second embodiment of the present disclosure placed in an acoustic environment with a moving first object and non-moving second object.

Referring to FIG. 4 showing a schematic diagram of an audio device 200 according to the second embodiment of the present disclosure placed in an acoustic environment with a moving first object 10 and a non-moving second object 11. In the shown example, the one or more first output transducers 202 are configured to emit the first ultrasound signal with a spread of 180 degrees and forms a first region 20 in which first movement may be detected. The one or more second output transducers 202 are configured to emit the second ultrasound signal with a spread of 180 degrees and form a second region 21 in which second movement may be detected. The first region 20 and the second region 21 do not overlap, thus, allowing for the first region 20 and the second region 21 to cover all around the audio device 200. The moving first object 10 is a first user 10 of the audio device 200, and the non-moving second object 11 is a second user 11 of the audio device 200. The first user 10 is moving relative to the audio device 200 within the first region 20, in which the audio device 200 is emitting the first ultrasound signal into via the one or more first output transducers 202. The audio device 200 is then able to determine first movement of the first user 10, by processing the first reflection indicative of the first ultrasound signal received by the one or more input transducers 203. The processor 204 of the audio device 200 may in response to determining first movement, adjust one or more audio processing parameters of the audio device 200. The second user 10 is staying stationary relative to the audio device 200 within the second region 20, in which the audio device 200 is emitting the second ultrasound signal into via the one or more first output transducers 202. The audio device 200 is then able to determine no second movement of the second user 10, by processing the second reflection indicative of the second ultrasound signal received by the one or more input transducers 203 or the one or more second input transducers 209. Consequently, as no second movement is determined does not adjust one or more audio processing parameters of the audio device 200 based on determined second movement.

The processor 204 may determine a first set of beamformer parameters associated with the first region 20. The processor 204 may determine a second set of beamformer parameters associated with the second region 20. In response to first movement being detected in the first region 20, the processor may adjust the first set of beamformer parameters. In response to second movement being detected in the second region 21, the processor may adjust the second set of beamformer parameters.

The processor 204 may be configured to, if first movement is determined, determine one or more predetermined beamformer parameters associated with the first region 20, and in response to speech being detected in the first region 20 by the audio device 200, determine one or more beamformer parameters based on the one or more predetermined beamformer parameters associated with the first region 20.

The processor 204 may be configured to, if second movement is determined, determine one or more predetermined beamformer parameters associated with the second region 21, and in response to speech in the second region 21 being detected by the audio device 200, determine one or more beamformer parameters based on the one or more predetermined beamformer parameters associated with the second region 21.

Figure 5:
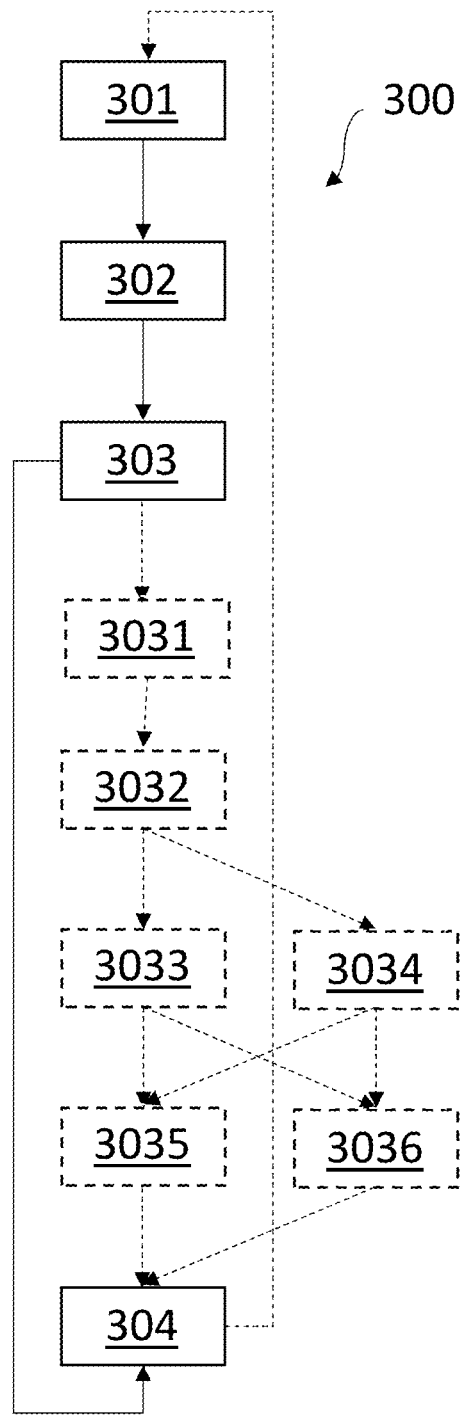
FIG. 5 is a flow diagram of a method according to the present disclosure.

Referring to FIG. 5 showing a flow diagram of a method 300 according to the present disclosure. The steps of the method 300 may be performed by an audio device 100, 200 according either the first embodiment or the second embodiment. The method comprises the step of emitting 301 a first ultrasound signal into a first region surrounding an audio device. The method comprises the step of receiving 302 a first reflection indicative of the first ultrasound signal. The method comprises the step of processing 303 the first reflection to determine first movement of a first object within the first region. The method comprises the step of, in response to first movement being determined, adjusting 304 one or more audio processing parameters. The step of processing 303 the first reflection to determine first movement of a first object within the first region may further comprise the below mentioned steps. The step of processing 303 the first reflection to determine first movement of a first object within the first region, may comprise determining 3031 a max speed for which movement of the first object is determined, and determining 3032 an analysis frequency range in which a centre frequency shift is determined based on the max speed movement. The step of processing 303 the first reflection to determine first movement of a first object within the first region, may comprise determining 3033 the centre shift based on a predetermined centre frequency of the first ultrasound signal. The step of processing 303 the first reflection to determine first movement of a first object within the first region, may comprise determining 3034 a plurality of side shifts in a number of predetermined sidebands of the first ultrasound signal, such as 2-20 sidebands, preferably 4-12 sidebands. The step of processing 303 the first reflection to determine first movement of a first object within the first region, may comprise comparing 3035 the centre shift and/or the plurality of side shifts to a lower movement threshold, and wherein if the centre shift and/or the plurality of side shifts exceed the lower movement threshold determine first movement of the first object within the first region. The step of processing 303 the first reflection to determine first movement of a first object within the first region, may comprise comparing 3036 the centre shift and/or the plurality of side shifts to a higher movement threshold, and wherein if the centre shift and/or the plurality of side shifts exceeds the higher movement threshold determine no movement of the first object within the first region. The step of processing 303 the first reflection to determine first movement of a first object within the first region may comprise using a Goertzel algorithm.

The step of processing 303 the first reflection to determine first movement of a first object within the first region may be a computer-implemented method. The step of adjusting 304 one or more audio processing parameters may also form part of the computer-implemented method. The computer-implemented method may be carried out by a processor 104, 204 of the audio device 100, 200.

Figure 6:
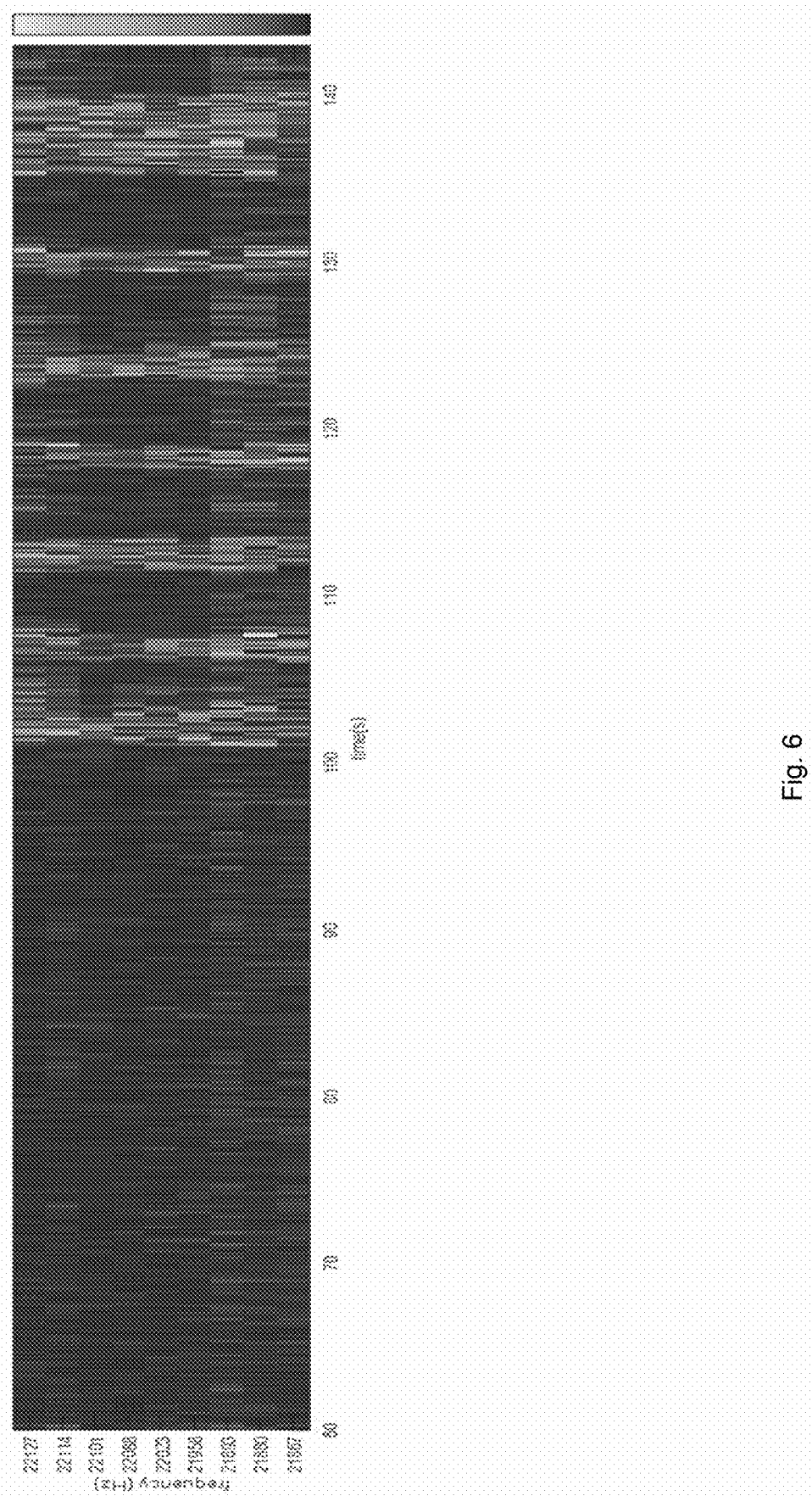
FIG. 6 is a graph of data obtained by an audio device according to the present disclosure.

Referring to FIG. 6, showing a graph of data obtained by an audio device 100, 200 according to the present disclosure. On the graph we have time on the X-axis, frequency on the Y-axis, and each data point is filled in with a grayscale color, where a brighter color indicates a higher measured magnitude, and a darker color indicates a lower measured magnitude. Furthermore, the Y-axis can be seen to be separated into a plurality of frequency bins. Then frequency bins may be translated into a frequency analysis range. The frequency bins to be analyzed are selected based on maximum speed for which movement should be determined on the centre frequency of the ultrasound signal emitted, and sidebands of the emitted ultrasound signal. On the graph until around 100 seconds, it can be seen a low magnitude is measured. The measured low magnitude corresponds to no frequency shift of either the centre frequency or the sidebands being detected. However, at 100 seconds an increase in magnitude can be seen to be measured. The increase in magnitude corresponds to frequency shifts of the centre frequency and the sidebands being detected. The frequency shifts arise due to emitted ultrasound being reflected of a moving object in the region in which the audio device 100, 200 is emitting ultrasound into. Consequently, by determining the change in magnitude, or the magnitude, first movement may be detected.

Figure 7A:
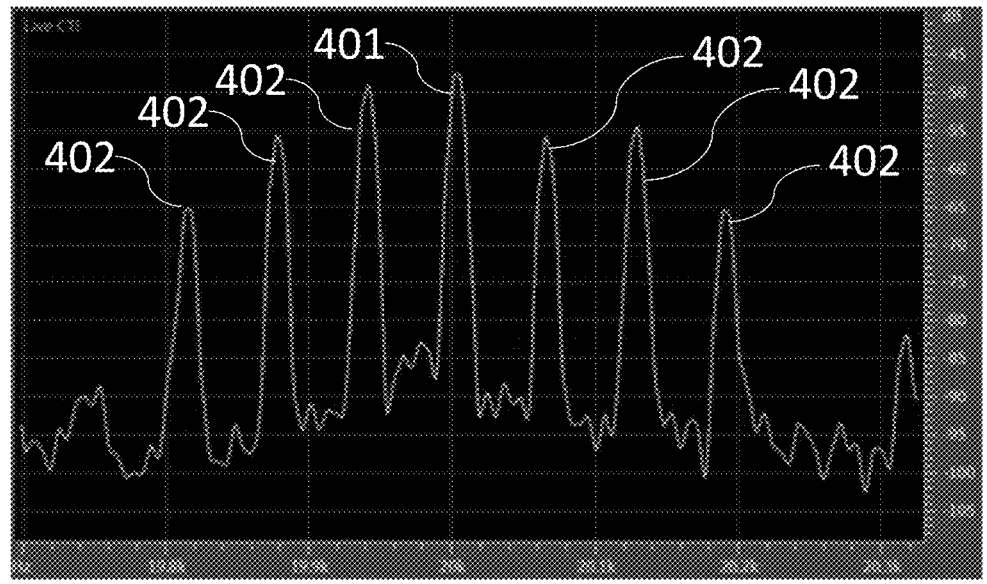
FIGS. 7a and 7b are graphs of data obtained by an audio device according to the present disclosure.
Figure 7B:
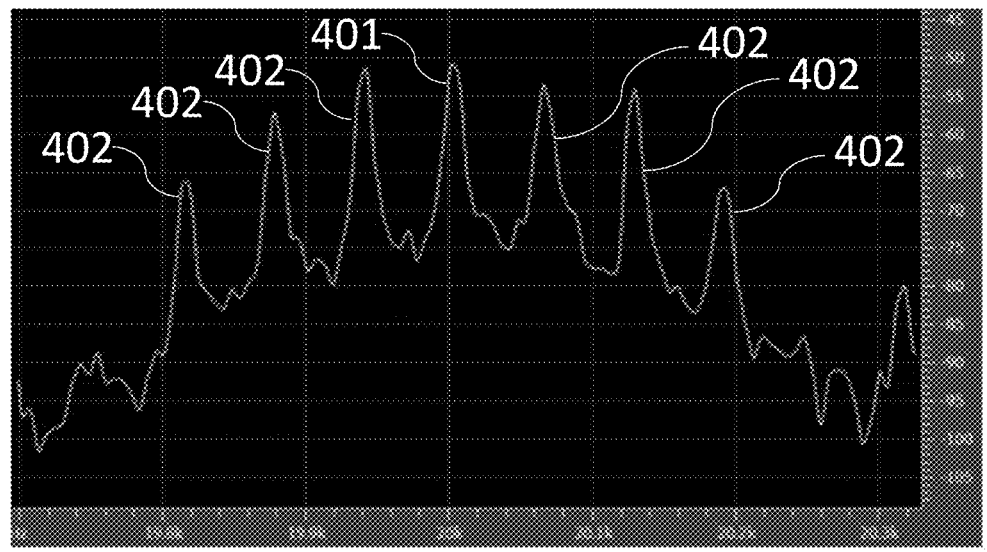

Referring to FIGS. 7a and 7b showing graphs of data obtained by an audio device 100, 200 according to the present disclosure. On both graphs frequency is on the X-axis and power in dB is on the Y-axis.

FIG. 7a shows a measurement result of a non-dynamic acoustic environment, i.e., a substantially static environment. A well-defined carrier frequency 401 is observed. The carrier frequency 401 has a predetermined centre frequency. A plurality of sidebands 402 is also seen next to the carrier frequency 401. The observed carrier frequency 401 and the sidebands 402 are created by ultrasound reflecting of stationary objects, where the reflections of the stationary objects are received by one or more input transducers of the audio device 100, 200. The stationary objects do not give rise to a frequency shift.

FIG. 7b shows a measurement result of a dynamic acoustic environment, i.e., an environment comprising one or more moving objects. Still a well-defined carrier frequency 401 is observed, together with a plurality of sidebands 402. The observed carrier frequency 401 and the sidebands 402 are still created by ultrasound reflecting of stationary objects, where the reflections of the stationary objects are received by one or more input transducers of the audio device 100, 200. However, it is clearly noticeable that the one or more moving objects give rise to a frequency shift of the carrier frequency 401 and the side bands 402. As the power level next to the sidebands 402 and the carrier frequency rises substantially in contrast to the stationary situation showed in FIG. 7a.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the spirit and scope of the claimed disclosure. The specification and drawings are, accordingly, to be regarded in an illustrative rather than restrictive sense. The claimed disclosure is intended to cover all alternatives, modifications, and equivalents.

The invention claimed is:

1. An audio device comprising, an interface, one or more first output transducers, one or more input transducers, and a processor, wherein the audio device is configured to:
   emit by the one or more first output transducers a first ultrasound signal into a first region surrounding the audio device,
   receive a first reflection indicative of the first ultrasound signal via the one or more input transducers,
   process by the processor the first reflection to determine first movement of a first object within the first region, and
   in response to first movement being determined, adjust by the processor one or more audio processing parameters of the audio device wherein to process the first reflection to determine first movement of the first object within the first region comprises to determine a center shift based on a predetermined center frequency of the first ultrasound signal, and
   wherein to process the first reflection to determine first movement of the first object within the first region comprises to compare the center shift to a higher movement threshold, and wherein if the center shift exceeds the higher movement threshold determine no movement of the first object within the first region.

2. An audio device according to claim 1, wherein the one or more audio processing parameters comprises one or more parameters associated with a beamformer of the audio device.

3. An audio device according to claim 2, wherein the one or more audio processing parameters associated with a beamformer of the audio device comprises a beamformer update rate.

4. An audio device according to claim 1, wherein the one or more audio processing parameters comprises one or more parameters associated with an echo controller of the audio device.

5. An audio device according to claim 4, wherein the one or more audio processing parameters associated with an echo controller of the audio device comprises a threshold for near end speech classification.

6. An audio device according to claim 1, wherein to process the first reflection to determine first movement of the first object within the first region comprises to compare the centre shift to a lower movement threshold, and wherein if the centre shift exceed the lower movement threshold determine first movement of the first object within the first region.

7. An audio device according to claim 1, wherein to process the first reflection to determine first movement of a first object within the first region comprises to:
   determine a max speed for which movement of the first object is determined
   determine an analysis frequency range in which the centre frequency shift is determined based on the max speed movement and the predetermined centre frequency.

8. An audio device according to claim 1, wherein to process the first reflection to determine first movement of the first object within the first region comprises to determine a plurality of side shifts in a number of predetermined sidebands of the first ultrasound signal, such as 2-20 sidebands, preferably 4-12 sidebands.

9. An audio device according to claim 1, wherein to process the first reflection to determine first movement of the first object within the first region comprises using a Goertzel algorithm.

10. An audio device according to claim 1 comprising one or more second output transducers, wherein the audio device is configured to:
    emit by the one or more second output transducers a second ultrasound signal into a second region surrounding the audio device, wherein the second region differs from the first region,
    receive a second reflection indicative of the second ultrasound signal via the one or more input transducers,
    process by the processor the second reflection to determine second movement of a second object within the second region,
    adjust by the processor one or more audio processing parameters of the audio device based on the determined first movement and/or the determined second movement.

11. An audio device according to claim 10, wherein the audio device is configured to:
    determine by the processor a first set of beamformer parameters associated with the first region,
    determine by the processor a second set of beamformer parameters associated with the second region,
    if first movement is determined, adjust by the processor the first set of beamformer parameters,
    if second movement is determined, adjust by the processor the second set of beamformer parameters.

12. An audio device according to claim 10, wherein the audio device is configured to:
    if first movement is determined, determine by the processor one or more predetermined beamformer parameters associated with the first region, and in response to speech in the first region being detected by the audio device, determine one or more beamformer parameters based on the one or more predetermined beamformer parameters associated with the first region, if second movement is determined, determine by the processor one or more predetermined beamformer parameters associated with the second region, and in response to speech in the second region being detected by the audio device, determine one or more beamformer parameters based on the one or more predetermined beamformer parameters associated with the second region.

* * * * *